US009524650B2

(12) United States Patent
Yavari

(10) Patent No.: US 9,524,650 B2
(45) Date of Patent: Dec. 20, 2016

(54) AUTOMATED TRAINING SYSTEM

(71) Applicant: Hesam Yavari, Hadley Wood (GB)

(72) Inventor: Hesam Yavari, Hadley Wood (GB)

(73) Assignee: Hesam Yavari, Hadley Wood (GB)

( * ) Notice: Subject to any disclaimer, the term of this patent is extended or adjusted under 35 U.S.C. 154(b) by 131 days.

(21) Appl. No.: 13/908,294

(22) Filed: Jun. 3, 2013

(65) Prior Publication Data

US 2014/0322691 A1    Oct. 30, 2014

(30) Foreign Application Priority Data

Apr. 24, 2013  (GB) .................................. 1307375.4

(51) Int. Cl.
*G09B 5/04*           (2006.01)

(52) U.S. Cl.
CPC ...................................... *G09B 5/04* (2013.01)

(58) Field of Classification Search
CPC ............... G09B 5/00; G09B 5/02; G09B 5/04; G09B 9/00
USPC ........................................................ 434/321
See application file for complete search history.

(56) References Cited

U.S. PATENT DOCUMENTS

| | | | | |
|---|---|---|---|---|
| 6,151,571 A | * | 11/2000 | Pertrushin | ..................... 704/209 |
| 8,068,598 B1 | | 11/2011 | Russi et al. | |
| 2003/0207237 A1 | * | 11/2003 | Glezerman | .............. G09B 5/06 434/118 |
| 2005/0170326 A1 | * | 8/2005 | Koehler et al. | ............... 434/350 |

* cited by examiner

*Primary Examiner* — Timothy A Musselman
(74) *Attorney, Agent, or Firm* — Hallie A. Finucane; Westman, Champlin & Koehler, P.A.

(57) ABSTRACT

An automated training system comprising a database containing audio files and a training script that defines a sequence of the audio files making up a training call. The system includes a training engine that automatically makes a call to an external system via a first communications connection, executes the training script and outputs audio data contained in the audio files to the external system via the first communications connection in accordance with the training script. The system has a response receiver that receives voice data from the external system, the voice data representing the voice responses of a user of the external system to the training call. A method for training an employee using the automated training system is also disclosed.

19 Claims, 3 Drawing Sheets

AUTOMATED TRAINING SYSTEM

CROSS-REFERENCE TO RELATED APPLICATION

This Application claims priority to GB patent application Serial No. 1307375.4, filed Apr. 24, 2013, the content of which is hereby incorporated by reference in its entirety.

FIELD OF THE INVENTION

The invention relates to an automated training system and method for training employees such as contact center agents.

BACKGROUND

The process of training agents to work in a contact center can be time consuming and expensive. It can also be difficult to determine whether a trainee contact center agent has reached the required standard in an objective and consistent manner. It normally takes a contact center manager many hours to train new agents to respond to calls in the way required by the organisation operating the contact center. There are hundreds of different possible customer queries and requests that the agents may have to handle, which may relate to a wide range of products and services. It also takes many hours for the manager to test the trained agents and analyse the results of those tests to ensure that the trained agents have attained the required standard.

BRIEF SUMMARY OF THE INVENTION

According to a first aspect of the invention, there is provided an automated training system comprising a database containing audio files and a training script that defines a sequence of the audio files making up a training call; a training engine that automatically makes a call to an external system via a first communications connection, executes the training script and outputs audio data contained in the audio files to the external system via the first communications connection in accordance with the training script; and a response receiver that receives voice data from the external system, the voice data representing the voice responses of a user of the external system to the training call.

Since the training system of the invention makes the training call to the external system itself and goes through the entire training call automatically based on the stored training script, there is no need for human intervention from an operator of the training system. This can save a significant number of man hours, particularly when it is desired to train a large number of employees at a time and several training calls are required as part of their training, as is generally the case. In addition, the system of the invention ensures that training is always performed to the same standard for every employee.

In one embodiment, the system stores the received voice data in a response file in the database.

The automated training system further comprises an automated speech recognition system that receives and interprets the voice data. In one embodiment, the automated training system further comprises an analysis engine that receives data representing the voice responses from the automated speech recognition system, compares the voice responses of the user of the external system to stored expected voice responses, and generates a scoring report for the user based on the comparison.

The automated training system further comprises a speech analysis component that receives the voice data and determines the tone of the voice of the user of the external system based on the voice data. In one embodiment, the automated training system further comprises an analysis engine that receives data representing the tone of the voice of the user of the external system from the speech analysis component, and generates a scoring report for the user based on the tone.

In one embodiment, the automated training system further comprises an analysis engine that measures the time elapsed between each audio file being output to the external system and receipt of an appropriate voice response, and generates a scoring report for the user based on the measured times. In one embodiment, the automated training system further comprises an analysis engine that measures the total time of the training call, and generates a scoring report for the user based on the measured total time.

The automated training system further comprises an analysis engine that receives data representing the voice responses from the automated speech recognition system, determines the number of words in the voice responses that were not understood by the automated speech recognition system, and generates a scoring report for the user based on the determined number of words.

In one embodiment, the automated speech recognition system asks the user to repeat a voice response if the response is not understood by the automated speech recognition system, and the automated training system further comprises an analysis engine that determines the number of times the automated speech recognition system asked the user to repeat a voice response, and generates a scoring report for the user based on the determined number of times.

The response receiver also receives external system response data representing the responses of the user of the external system to the training call via the external system, the responses being made via one or more input devices, and the system stores the received external system response data in a response file in the database. In one embodiment, the analysis engine compares the external system responses of the user of the external system to stored correct external system responses and generates a scoring report for the user based on the comparison.

In one embodiment, the received external system response data is data representing a screen displayed to the user of the external system. The system receives the external system response data via a second communications connection.

In one embodiment, the system receives data representing a screen displayed to the user of the external system from the external system substantially in real time during the training call. In one embodiment, the data representing a screen displayed to the user of the external system is stored in the database.

The system receives the voice data via the first communications connection. In one embodiment, the external system is a contact center call handling system.

According to a second aspect of the invention, there is provided a method for training an employee using the automated training system described above, the method comprising providing a database containing audio files and a training script that defines a sequence of the audio files making up a training call, making the call to the external system via the first communications connection; executing the training script and outputting the audio data contained in the audio files to the external system via the first communications connection in accordance with the training script; and receiving the voice data from the external system, the voice data representing the voice responses of a user of the external system to the training call.

In one embodiment, the method further comprises storing the received voice data in a response file in the database.

The method further comprises interpreting the voice data using an automated speech recognition system.

In one embodiment, the method further comprises receiving data representing the voice responses from the automated speech recognition system; comparing the voice responses of the user of the external system to stored correct voice responses; and generating a scoring report for the user based on the comparison.

In one embodiment, the method further comprises measuring the time elapsed between each audio file being output to the external system and receipt of an appropriate voice response; and generating a scoring report for the user based on the measured times.

The method further comprises measuring the total time of the training call; and generating a scoring report for the user based on the measured total time.

In one embodiment, the method further comprises receiving data representing the voice responses from the automated speech recognition system; determining the number of words in the voice responses that were not understood by the automated speech recognition system; and generating a scoring report for the user based on the determined number of words.

The automated speech recognition system asks the user to repeat a voice response if the response is not understood by the automated speech recognition system, and the method further comprises determining the number of times the automated speech recognition system asked the user to repeat a voice response; and generating a scoring report for the user based on the determined number of times.

In one embodiment, the method further comprises receiving external system response data representing responses of the user of the external system to the training call via the external system, the input responses being made via one or more input devices, and storing the received external system response data in a response file in the database. The method further comprises comparing the external system responses of the user of the external system to stored correct external system responses and generating a scoring report for the user based on the comparison.

In one embodiment, the method is for training a contact center agent.

BRIEF DESCRIPTION OF THE DRAWINGS

Exemplary embodiments of the present invention will now be described by way of further example only and with reference to the accompanying drawings, in which.

DETAILED DESCRIPTION

Although aspects of the invention are described below in relation to a contact center, the automated training system can equally be applied to any situation in which it is necessary to train people to respond to queries from customers or members of the public. For example, the automated training system of the invention could be used to train someone working in a receptionist role in any type of business.

Figure 1:
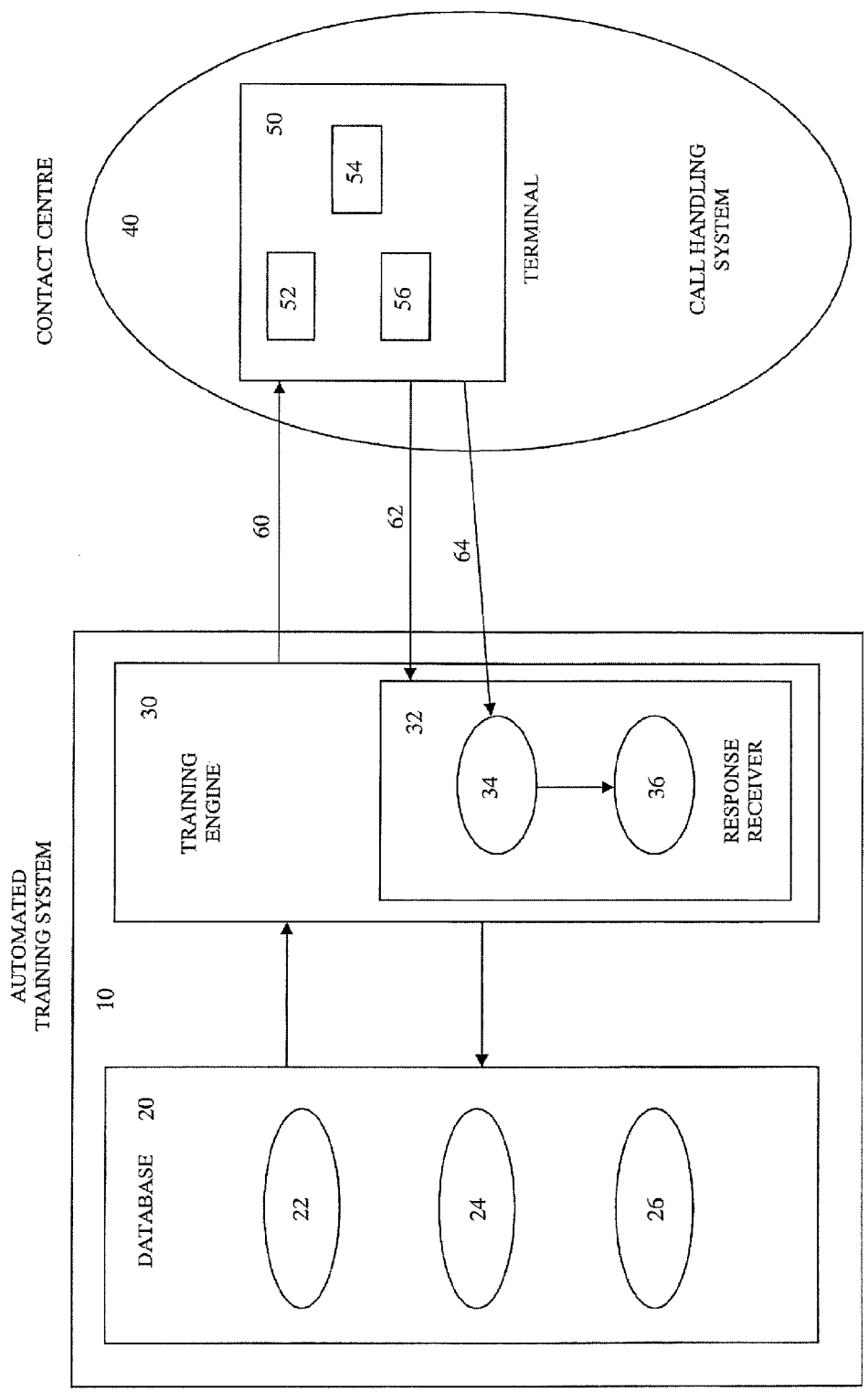
FIG. 1 is a schematic diagram of an automated training system in an embodiment of the invention.

The system can be used for training contact center agents or customer service representatives to a higher standard more quickly and with less input from a manager being required. Since the training system of the invention makes the training call to the external system itself and goes through the entire training call automatically based on the stored training script, there is no need for human intervention from an operator of the training system. This can save a significant number of man hours, particularly when it is desired to train a large number of employees at a time and several training calls are required as part of their training, as is generally the case. In addition, the system of the invention ensures that training is always performed to the same standard for every employee An automated training system 10 is illustrated in FIG. 1. Although not required, the automated training system 10 and call handling system 40 will be described, at least in part, in the general context of computer-executable instructions, such as program modules, being executed by a computer. Generally, program modules include routine programs, objects, components, data structures, etc., which perform particular tasks or implement particular abstract data types. Those skilled in the art can implement the description below and/or block diagrams using computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

An embodiment of an automated training system 10 comprises a database 20 and a training engine 30. The database 20 includes audio files 22, training scripts 24 and response files 26. The training engine 30 includes a response receiver 32, which itself comprises an automatic speech recognition system (ASR) 34 and an analysis engine 36.

The automated training system 10 communicates with a call handling system 40 of a contact center. One terminal 50 of the call handling system 40 includes a headset 52, input devices 54 and a display 56. The automated training system 10 outputs audio data 60 to the contact center and receives external system response data 62 and voice response data 64 from the contact center.

The audio files 22 stored in the database 20 represent example telephone queries that might be received by a contact center agent. The audio files 22 are typically generated by recording an actor reading a script of part of a possible conversation with a contact center. For example, one audio file 22 may contain a recording of a customer asking to transfer funds from one bank account to another. Subsequent audio files 22 may contain further parts of the same conversation, for example the customer responding to the agent's request for security details. In this way, the customer side of entire dialogues can be stored in the system. Audio files 22 for a wide range of queries are in one embodiment recorded and then uploaded to the database 20 prior to use of the training system 10. The audio files 22 may contain queries in a variety of different languages and accents. This means that the system can be used worldwide and can also test an agent in a given location on their understanding of various local regional accents.

The training scripts 24 contain a sequence of audio files 22 to be played, the sequences representing calls between a customer and the contact center. The training scripts 24 also contain information on the responses expected from the contact center agent receiving the calls to each part of each call.

The response files 26 contain the stored responses of actual contact center agents to the training scripts 24 run on the training system 10. The stored responses can be analyzed either manually or automatically by the training system 10 to determine whether contact center agents have been trained to the required standard.

In one embodiment, the stored responses are scored automatically by matching each agent's responses to a corresponding stored answer script using the ASR 34. The answer script may be stored together with the corresponding training script. The answer script may also be stored in or accessed by the contact center call handling system 40 and displayed to the agent during the training call. The training engine 30 may also include a speech analysis component, which determines the mood and tone of the contact center agent during the training call by analysing the agent's speech in their responses. The speech analysis component can determine whether the agent was aggressive or calm when responding to the customer for example, and the automatic scoring of the stored responses can be adjusted accordingly by the training system 10.

Figure 2:
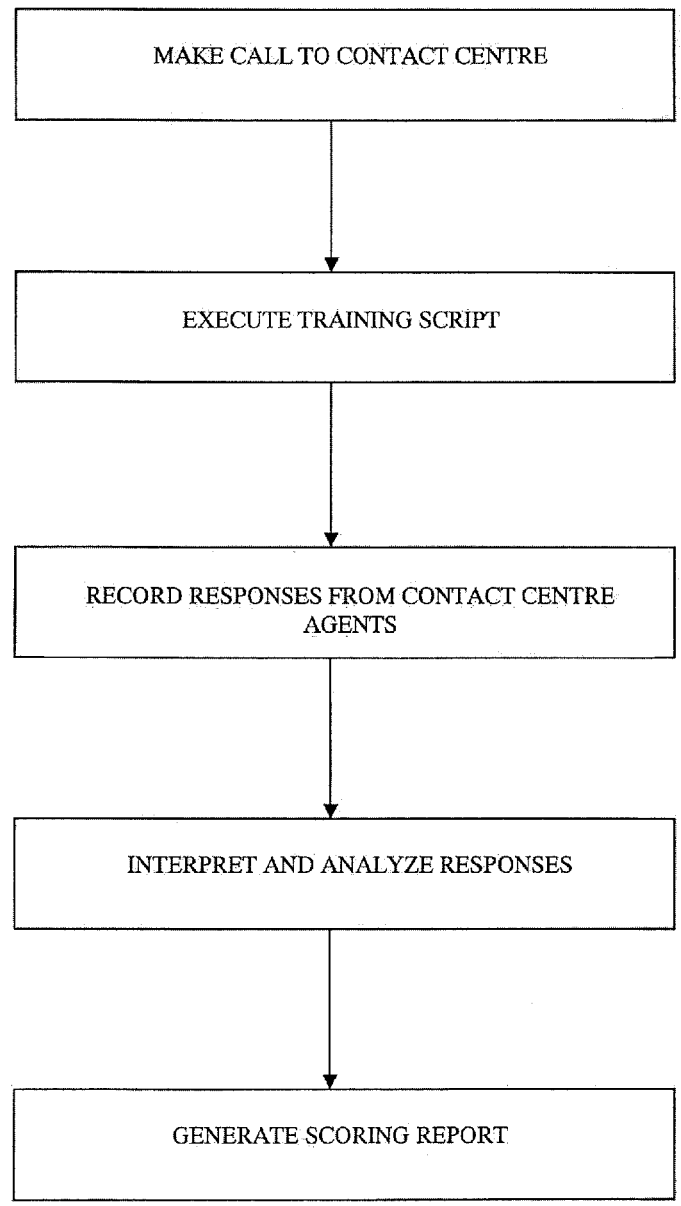
FIG. 2 is a flow diagram showing the operation of an automated training system in an embodiment of the invention.

The automated training system 10 performs the process illustrated in FIG. 2 in operation. All of the steps shown in FIG. 2 can be performed automatically by the system of the invention, without requiring human intervention.

The training engine 30 selects a stored training script 24 to run based on input by a user or based on predefined criteria, such as a stored date and time. The training engine 30 also selects a contact center to perform the training script 24 on based either on user input or predefined conditions. The telephone numbers and/or network addresses of various contact centers may be stored in the training system 10 to be used by the system to contact the contact centers.

The training engine 30 first makes a call to the contact center and then executes the training script 24 by playing the sequence of audio files 22 specified in the training script 24 when a contact center agent answers the call. Depending on the type of call handling system 40 used by the contact center, the training system 10 may send the audio over any kind of communications network such as a telephone line or the internet to the contact center. The training engine 30 pauses between each part of the call defined in the training script 24 to allow the contact center agent to respond.

On the contact center side, the call handling system 40 is operated by the contact center agent. Typically, the contact center agent will have a headset 52 consisting of headphones and a microphone connected to the call handling system 40. Audio output by the training system 10 to the contact center is routed through the call handling system 40 to the headphones or telephone handset device of the agent. In addition, the call handling system 40 displays information to the agent via a display such as a monitor. The call handling system 40 accepts voice inputs from the agent via the microphone and other data inputs via input devices such as a keyboard and mouse.

In addition to outputting audio to the contact center, the training system 10 is able to receive audio and other data from the contact center. This allows the response receiver 32 component of the training system 10 to record the responses of the contact center agent to the training script for analysis. The voice responses of the agent to the audio files 22 making up the training script can be sent by the contact center to the training system 10 in the same way as they would be if the training system 10 was a real customer making a call, whether over a conventional telephone network or other form of network.

The training system 10 of the embodiment also receives a recording of the screen displayed to the contact center agent by the call handling system 40 of the contact center, which is sent by the call handling system 40 as well as the voice responses. The training system 10 may record the entirety of the information displayed on the agent's monitor for the duration of the training call, or only the most relevant parts of that information.

The recording of the screen of the agent received by the training system 10 includes the inputs made by the agent to the call handling system 40 in response to the training call. The agent typically interacts with a Customer Relationship Management (CRM) system of the contact center while dealing with the customer queries in the training call. The recording of the agent's screen will make all of these interactions visible after the training call is completed.

All of the voice responses and screen recordings representing the responses of the contact center agent to the training script are recorded and stored in the database 20 of the training system 10 as response files 26. The system then allows contact center managers to play back the recorded voice responses and screen recordings to rate how well the agent responded to the training script and thereby determine whether the agent has been trained to the required standard. Typically, the scoring is done by the training system 10 presenting a contact center manager with tick boxes that can be checked or left unchecked as the manager reviews the responses of a particular agent. The set of tick boxes checked by the manager is then stored as part of a scoring report on the agent. The manager may also produce a scoring report based on scores assigned to a set of predefined criteria or questions. The criteria may be defined for each contact center individually and stored in the training system 10 assigned to the corresponding contact center.

In one embodiment, the entire screen displayed on the monitor of the contact center agent is received by the training system 10 for the duration of the training call. In this case, the system allows contact center managers to watch the screens of the contact center agents in real time as they are handling the training calls. As discussed above, a recording of the screen is also stored in the database 20.

In some embodiments the process of analyzing and rating the responses may be performed manually by the contact center managers. However, in some embodiments, the training system 10 can analyze the responses and generate a scoring report for the agent automatically. This saves more time and effort for the contact center staff. Once automated scoring has been performed, contact center managers can review the automated scores given to particular agents and then choose to leave the automated scoring as it is or re-score the agents manually after reviewing the agents' responses to the training call.

The response receiver 32 component of the training system 10 includes an automatic speech recognition system (ASR). The response receiver 32 component may also include the speech analysis component discussed above, which can determine the mood and tone conveyed by the agent's voice responses. The voice responses from the call handling system 40 are received by the ASR 34, which then determines the words spoken by the contact center agent in response to the training script. This data is passed on to the analysis engine 36.

When the speech analysis component is provided, the voice responses from the call handling system 40 are also received by the speech analysis component and data on the tone of the agent's responses is passed from the speech analysis component to the analysis engine 36.

If the contact center agent makes a voice response that the ASR 34 is unable to interpret then the training system 10 asks the agent to repeat the response by outputting an appropriate audio file 22 to the call handling system 40. The training system 10 may ask the agent to repeat the response until a clear response is received or a maximum number of repetitions is reached.

Based on the data from the ASR 34 and information defining correct responses included in the training script or stored separately in the database 20, the analysis engine 36 determines whether or not the contact center agent has responded correctly to the training script. The analysis engine 36 also receives the data inputs made by the contact center agent from the call handling system 40 and compares these with correct data inputs stored in the database 20 to determine whether the contact center agent responded correctly to each part of the training script.

The analysis engine 36 may also determine how clearly the contact center agent spoke in responding to the training call based on data from the ASR 34 and the speech analysis component. For example, the number of words in the responses that were not recognised by the ASR 34 may be recorded and used as a measure of any lack of clarity in the agent's speech. In addition, the number of times that the training system 10 had to ask the contact center agent to repeat a response because the ASR 34 could not initially understand the response may be recorded and used as a metric.

The analysis engine 36 can determine other properties of the responses made by the contact center agent. For example, the analysis engine 36 may determine how quickly the agent responded to each part of the training script. The analysis engine 36 may also measure the total time of the call and compare this to information on the optimum total length of calls stored in the training system 10. This data can then be used to determine the most efficient manner in which to deal with the customer queries so that the average time taken to handle the query is reduced.

Based on how correct the contact center agent's responses to the training call were determined to be and any other factors deemed relevant such as the speed of the responses, the analysis engine 36 generates a scoring report for the agent. The analysis engine 36 may produce a single number rating the overall performance of the agent or a more detailed report with scores in several categories such as response precision, clarity of speech and speed.

The correctness of the agent's responses may be broken down into whether, for example, the agent responded using the correct vocabulary as determined by the analysis engine 36, whether the agent asked the correct questions in response to the appropriate parts of the training call and whether the advice provided by the agent to the customer in the training call was correct. Each of these categories may be scored separately by the analysis engine 36 based on information defining the correct vocabulary, questions and advice contained in the training script or stored elsewhere in the database 20. Generally the information on correct responses is supplied to the training system 10 by the contact center staff.

The criteria used to produce the scoring report and the weighting of different factors are determined by a scoring matrix, which is stored in the database 20 of the training system 10. A different scoring matrix may be stored for each contact center so that the contact center's own preferred performance metrics can be reflected in the scoring reports generated by the training system 10.

The training system 10 may store training scripts 24 in multiple languages. For example, a given training script may be associated with a set of audio files 22 including the same training call translated into several different languages and optionally a set of files defining correct responses to the call in each of those languages to allow automatic scoring. The same scoring matrix can be used for all languages. A user of the training system 10 may then simply select the language of the contact center and instruct the system to execute the training script to perform training in the language of the contact center.

In an alternative embodiment, it is possible to store the training calls as text files rather than audio files 22 in the database 20. In this embodiment, the training system 10 also includes an automatic text-to-speech system that converts the text to audio before sending it to the contact center system during execution of a training script. It is also possible for the training system 10 to send the text files directly to the contact center system if the contact center system itself contains an automatic text-to-speech system that can generate the training calls from the text files.

Conversely, the training system 10 could convert the voice responses from agents into text using a speech to text component, so that the training system 10 can store the voice responses as text rather than audio files 22 in the database 20. This feature saves storage space.

Figure 3:
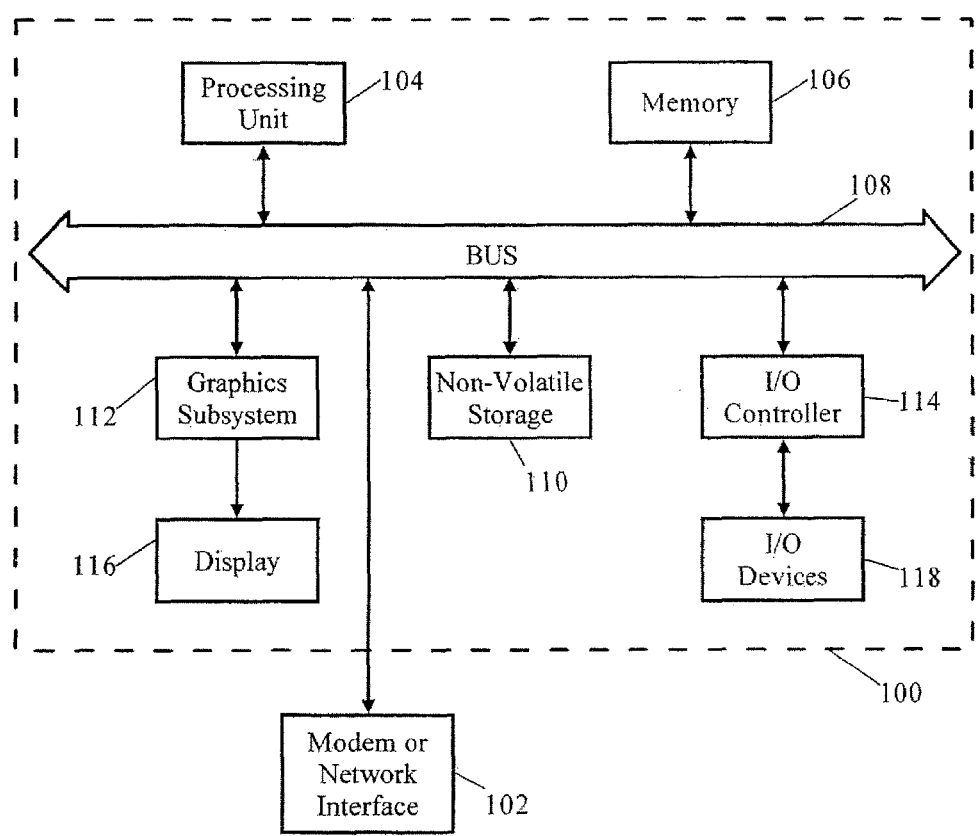
FIG. 3 shows an example of hardware in which the system of an embodiment can be implemented.

FIG. 3 illustrates an exemplary embodiment of a computer system 100 in which the system and method of the present invention may be realised. Both the automated training system 10 and the contact center call handling system 40 may be implemented in such hardware.

The computer system 100 may interface to external systems through a fixed wire or wireless connection or any other network interface 102 such as analog or ISDN modems, cable modems (ADSL/DSL), Ethernet or fibre optic interfaces, cellular or HSDS services and satellite transmission interfaces. The computer system 100 may also interface to external systems using Session Initiation Protocol (SIP). As shown in FIG. 3, the computer system 100 includes a processing unit 104, which may be a conventional microprocessor, such as an Intel Core microprocessor or an ARM Cortex microprocessor, which are known to one of ordinary skill in the computer art.

System memory 106 is coupled to the processing unit 104 by a system bus 108. System memory 106 may be a DRAM, RAM, static RAM (SRAM) or any combination thereof. Bus 108 couples processing unit 104 to system memory 106, to non-volatile storage 110, to graphics subsystem 112 and to input/output (I/O) controller 114. Graphics subsystem 112 controls a display device 116, for example a liquid crystal display, which may be part of the graphics subsystem 112. The display device 116 corresponds to the display or monitor discussed above. The I/O devices 118 may include one or more of a keyboard, tablet, stylus, disk drives, printers, a mouse, a touch screen or gesture driven interface and the like as known to one of ordinary skill in the computer art. The I/O devices correspond to the input devices discussed above.

The non-volatile storage 110 may be a magnetic hard disk, a flash memory or another form of storage for large amounts of data. Some of this data is often written by a direct memory access process into the system memory 106 during execution of the software in the computer system 100. The non-volatile storage 110 may contain the database 20 and/or program modules discussed above.

The foregoing description has been given by way of example only and it will be appreciated by a person skilled in the art that modifications can be made without departing from the scope of the present invention.

What is claimed is:

1. An automated training system comprising:
   a database containing audio files and a training script that defines a sequence of the audio files making up a training call;
   a training engine that automatically makes a call to an external system via a first communications connection, executes the training script and outputs audio data contained in the audio files to the external system via the first communications connection in accordance with the training script;
   a response receiver that receives:
   a) voice data from the external system, the voice data representing voice responses of a user of the external system to the training call, the response receiver comprising an automated speech recognition system that receives and interprets the voice data and a speech analysis component that receives the voice data and determines the tone of the voice of the user of the external system based on the voice data, and
   b) receives external system response data representing the responses of the user of the external system to the training call via the external system, the responses being made via one or more input devices, wherein the received external system response data comprises data representing a screen displayed to the user of the external system; and
   an analysis engine that:
   receives data representing the voice responses from the automated speech recognition system,
   determines the number of words in the voice responses that were not understood by the automated speech recognition system,
   compares the voice responses of the user of the external system to stored expected voice responses,
   compares the external system responses of the user of the external system to stored correct external system responses,
   receives data representing the tone of the voice of the user of the external system from the speech analysis component, and
   generates a scoring report for the user based on the determined number of words in the voice responses that were not understood, the comparison of the voice responses, the tone, and the comparison of the external system responses.

2. The automated training system according to claim 1, wherein the system stores the received voice data in a first response file in the database, and wherein the system stores the received external system response data in a second response file in the database.

3. The automated training system according to claim 1, wherein the analysis engine measures the time elapsed between each audio file being output to the external system and receipt of an appropriate voice response, and further generates the scoring report for the user based on the measured times.

4. The automated training system according to claim 1, wherein the analysis engine measures the total time of the training call, and further generates the scoring report for the user based on the measured total time.

5. The automated training system according to claim 1, wherein the data representing the screen displayed to the user of the external system is stored in the database.

6. The automated training system according to claim 1, wherein the automated speech recognition system asks the user to repeat a voice response if the response is not understood by the automated speech recognition system, and
   wherein the analysis engine determines the number of times the automated speech recognition system asked the user to repeat a voice response, and
   further generates the scoring report based on the determined number of times the automated speech recognition system asked the user to repeat the voice response.

7. The automated training system according to claim 1, wherein the screen displayed to the user of the external system is displayed on respective monitors of the user and a contact center manager for the duration of the training call.

8. The automated training system according to claim 1, wherein the comparison of the voice responses of the user of the external system to stored expected voice responses includes comparing words in the voice responses of the user to words of a predetermined vocabulary.

9. The automated training system according to claim 1, wherein the generation of the scoring report is based on a scoring matrix including fields related to the determined number of words in the voice responses that were not understood, the comparison of the voice responses, the tone, and the comparison of the external system responses.

10. The automated training system according to claim 9, wherein the voice responses include one or more languages, and wherein the scoring matrix is compatible with multiple languages.

11. The automated training system according to claim 9, further comprising a speech-to-text system that converts the voice responses into text and stores the text in the database as text files along with or instead of the audio files.

12. The automated training system according to claim 11, further comprising a text-to-speech system that converts the stored text files to respective audio files to be part of the execution of the training script.

13. The automated training system according to claim 1, further comprising a speech-to-text system that converts the voice responses into text and stores the text in the database as text files along with or instead of the audio files.

14. The automated training system according to claim 13, further comprising a text-to-speech system that converts the stored text files to respective audio files to be part of the execution of the training script.

15. The automated training system according to claim 14, wherein the generation of the scoring report is based on a scoring matrix including fields related to the determined number of words in the voice responses that were not understood, the comparison of the voice responses, the tone, and the comparison of the external system responses.

16. The automated training system according to claim 15, wherein the voice responses include one or more languages, and wherein the scoring matrix is compatible with multiple languages.

17. A method for automatically training an employee using an automated training system, the method comprising:
   providing a database containing audio files and a training script that defines a sequence of the audio files making up a training call;

making a training call to an external system via a first communications connection;
executing a training script and outputting audio data contained in a plurality of audio files to the external system via the first communications connection in accordance with the training script;
receiving voice data from the external system, the voice data representing voice responses of a user of the external system to the training call;
receiving external system response data representing responses of the user of the external system to the training call via the external system, the input responses being made via one or more input devices;
interpreting the voice data using an automated speech recognition system;
receiving data representing the voice responses from the automated speech recognition system;
comparing the voice responses of the user of the external system to stored correct voice responses;
comparing the external system responses of the user of the external system to stored correct external system responses;
requesting the user to repeat a given voice response if the response is not understood by the automated speech recognition system;
determining the number of times the automated speech recognition system asked the user to repeat the voice response; and
generating a scoring report for the user based on the comparisons and on the determined number of times the automated speech recognition system asked the user to repeat the voice response.

18. The method according to claim 17, further comprising:
storing the received voice data in a first response file in the database; and
storing the received external system response data in a second response file in the database.

19. An automated training system comprising:
a database containing audio files and a training script that defines a sequence of the audio files making up a training call;
a training engine that automatically makes a call to an external system via a first communications connection, executes the training script and outputs audio data contained in the audio files to the external system via the first communications connection in accordance with the training script;
a response receiver that receives:
a) voice data from the external system, the voice data representing the voice responses of a user of the external system to the training call, the response receiver comprising an automated speech recognition system that receives and interprets the voice data and a speech analysis component that receives the voice data and determines the tone of the voice of the user of the external system based on the voice data, and
b) receives external system response data representing the responses of the user of the external system to the training call via the external system, the responses being made via one or more input devices, wherein the received external system response data comprises data representing a screen displayed to the user of the external system; and
an analysis engine that:
receives data representing the voice responses from the automated speech recognition system,
determines the number of words in the voice responses that were not understood by the automated speech recognition system,
compares the voice responses of the user of the external system to stored expected voice responses,
compares the external system responses of the user of the external system to stored correct external system responses,
receives data representing the tone of the voice of the user of the external system from the speech analysis component,
requests the user to repeat a given voice response if the response is not understood by the automated speech recognition system,
determines the number of times the automated speech recognition system asked the user to repeat the voice response, and
generates a scoring report for the user based on the comparison of the voice responses, the tone, the determined number of words in the voice responses that were not understood, the external system responses, and the determined number of times the automated speech recognition system asked the user to repeat the voice response.

* * * * *